(12) United States Patent
Huo

(10) Patent No.: US 11,140,303 B2
(45) Date of Patent: Oct. 5, 2021

(54) CAMERA

(71) Applicant: BOSEN OPTO-ELECTRONIC TECHNOLOGY CO., LIMITED, Shen Zhen (CN)

(72) Inventor: Haoyang Huo, Shen Zhen (CN)

(73) Assignee: BOSEN OPTO-ELECTRONIC TECHNOLOGY CO. LIMITED, Shen Zhen (CN)

( * ) Notice: Subject to any disclaimer, the term of this patent is extended or adjusted under 35 U.S.C. 154(b) by 188 days.

(21) Appl. No.: 16/504,827

(22) Filed: Jul. 8, 2019

(65) Prior Publication Data

US 2019/0394369 A1   Dec. 26, 2019

(30) Foreign Application Priority Data

May 7, 2018   (WO) ................ PCT/CN2018/085868
Jul. 20, 2018   (CN) .......................... 201821156960.7

(51) Int. Cl.
*H04N 5/225* (2006.01)
*G02B 7/04* (2021.01)
*G02B 7/02* (2021.01)

(52) U.S. Cl.
CPC .......... *H04N 5/2254* (2013.01); *G02B 7/021* (2013.01); *G02B 7/026* (2013.01); *G02B 7/028* (2013.01); *G02B 7/04* (2013.01); *H04N 5/2252* (2013.01); *H04N 5/2257* (2013.01); *H04N 2005/2255* (2013.01)

(58) Field of Classification Search
CPC .. H04N 5/2254; H04N 5/2257; H04N 5/2252; H04N 2005/2255; G02B 7/04; G02B 4/028; G02B 7/021; G02B 7/026; G02B 7/008; G02B 7/025; G02B 9/64
See application file for complete search history.

(56) References Cited

U.S. PATENT DOCUMENTS

| | | | |
|---|---|---|---|
| 9,594,228 B1 | 3/2017 | Feng | |
| 9,802,386 B2 | 10/2017 | Takama et al. | |
| 9,883,086 B2 | 1/2018 | Knutsson et al. | |
| 2007/0146534 A1* | 6/2007 | Kim ..................... | H04N 5/2253 348/340 |
| 2015/0273799 A1* | 10/2015 | Takama ............... | H04N 5/2252 348/373 |

(Continued)

FOREIGN PATENT DOCUMENTS

| | | |
|---|---|---|
| CN | 201637917 U | 11/2010 |
| CN | 104950411 A | 9/2015 |
| CN | 105163007 A | 12/2015 |

(Continued)

*Primary Examiner* — Yogesh K Aggarwal
(74) *Attorney, Agent, or Firm* — Muncy, Geissler, Olds & Lowe, P.C.

(57) ABSTRACT

Provided is a camera, including a lens unit having a plurality of lenses and a frame receiving the plurality of lenses, a holding member holding the lens unit, and an image pickup element receiving a light beam transmitting the lenses. In the camera, the holding member has a thread portion by means of which the lens unit is movable along an optical axis, and at least one engagement portion engaging the lens unit. The thread portion has a meshing portion with a central point thereof provided on a side closer to an object than an intermediate portion of an optical total length of the camera.

18 Claims, 7 Drawing Sheets

(56) References Cited

U.S. PATENT DOCUMENTS

2017/0059807 A1* 3/2017 Feng ................. G02B 7/028
2017/0276895 A1* 9/2017 Sakuma ............... G02B 7/028

FOREIGN PATENT DOCUMENTS

| CN | 206431347 U | 8/2017 |
|----|-------------|--------|
| JP | 2008191423 A | 8/2008 |
| JP | 2009186756 A | 8/2009 |
| JP | 2009244387 A | 10/2009 |
| JP | 2010078772 A | 4/2010 |
| JP | 2010122642 A | 6/2010 |
| JP | 2014044283 A | 3/2014 |

* cited by examiner

CAMERA

CROSS-REFERENCE TO RELATED APPLICATION

The present application is based upon and claims the benefit of a priority of PCT Application No. PCT/CN2018/085868, filed on May 7, 2018 and Chinese Patent Application No. 201821156960.7, filed on Jul. 20, 2018, the entire contents of which are incorporated herein by reference.

TECHNICAL FIELD

The present disclosure relates to a camera carrying a lens unit comprising a plurality of lenses, and provides a camera capable of stably maintaining a focus position of lens even when the external environment such as external pressure and temperature changes.

BACKGROUND

Most cameras for vehicle camera, monitoring camera, etc. are equipped with a small-sized and low-cost pan-focus lens unit having a fixed focus.

For example, the camera according to JP2008191423A, JP2009186756A and JP2010078772A is configured such that an external thread formed on an outer periphery of a lens unit is threaded to an internal thread formed on an inner periphery of a holding member. The lens unit is moved along an optical axis by rotating the lens unit with regard to the holding member, so as to adjust the focus position of the lens with regard to the imaging plane.

The camera according to JP2009186756A is configured such that a lens unit is fixed to a holding member by an adhesive after the focus is adjusted.

The camera according to JP2010078772A is configured such that a seal member having elasticity is interposed between a lens unit and a housing in order to enhance waterproof and air-tight performance inside of the device.

Moreover, a camera according to U.S. Pat. No. 9,594,228 B1 is configured such that a collet is provided between a holding member and a frame, and the relation between the thermal expansion coefficients of the materials for each component is set to be constant, so as to suppress offset of the focus position of the lens when temperature changes.

SUMMARY

In the cameras according to JP2008191423A, JP2009186756A and JP2010078772A, the lens unit is positioned with regard to the holding member by thread only. Therefore, in order to stably maintain the focus position while preventing loosening between the external thread and the internal thread so as to generate no positional displacement of the lens unit in the direction of the optical axis or inclination of the optical axis, a thread of high accuracy is required. This incurs concern in increased costs.

In the camera according to JP2009186756A, the lens unit is fixed to the holding member by adhesive after the focus is adjusted. However, there is a concern that, when the adhesive itself deforms or expands or contracts due to changes in the external environment of the lens unit such as external pressure and temperature, the lens unit displaces and inclines, making it impossible to stably maintain the focus position.

The camera according to JP2010078772A has a concern that, when the lens unit and the housing offset due to errors in parts, under the elastic force of the seal member, a lateral pressure is applied to the lens unit and urges the optical axis to incline, making it impossible to stably maintain the focus position.

In the camera according to U.S. Pat. No. 9,594,228 B1, a collet (cylindrical clamp) is required between the holding member and the frame, incurring the concern of increased cost due to the addition of number of parts.

Furthermore, the camera according to U.S. Pat. No. 9,594,228 B1 requires different thermal expansion coefficients of the material of each of the holding member, the frame, and the collet. For example, when the material of the holding member is selected as a material having a thermal expansion coefficient apparently smaller than the thermal expansion coefficient of a general material usually used, the processability will worsen, and the cost of the material increases, incurring the concern of increased costs.

In these circumstances, the present disclosure is proposed. One of the objectives of the present disclosure is to provide a camera capable of stably maintaining the focus position of the lens even when external pressure changes.

As one of the objectives of the present disclosure, the present disclosure provides a camera capable of stably maintaining the focus position of the lens even when temperature changes.

As one of the objectives of the present disclosure, the present disclosure provides a camera of low cost and high accuracy.

In order to solve at least one of the afore-mentioned problems, the camera according to a technical solution of the present disclosure includes a lens unit having a plurality of lenses and a frame receiving the plurality of lenses, a holding member holding the lens unit, and an image pickup element receiving a light beam transmitting the lenses. The holding member has a thread portion by means of which the lens unit is movable along an optical axis, and at least one engagement portion engaging the lens unit, the thread portion having a meshing portion with a central point thereof provided on a side closer to an object than an intermediate portion of an optical total length of the camera.

The camera according to a further technical solution of the present disclosure includes a lens unit having a plurality of lenses and a frame receiving the plurality of lenses, a holding member holding the lens unit, and an image pickup element unit to which an image pickup element is mounted, the image pickup element receiving a light beam transmitting the lenses. The holding member has a lens unit holding portion holding the lens unit, and an image pickup element unit holding portion holding the image pickup element unit, wherein the material forming the lens unit holding portion is different from the material forming the image pickup element unit holding portion, wherein the material forming the lens unit holding portion and the material forming the image pickup element unit holding portion both have a smaller thermal expansion coefficient than that of the material forming the frame.

The camera according to a technical solution of the present disclosure is capable of stably maintaining a focus position of the lens even when external pressure changes.

The camera according to a further technical solution of the present disclosure is capable of maintaining a focus position of the lens even when ambient temperature changes, and is of low cost and high accuracy.

DETAILED DESCRIPTION

The camera according to some embodiments of the present disclosure is described in detail below with reference to the drawings.

Figure 1:
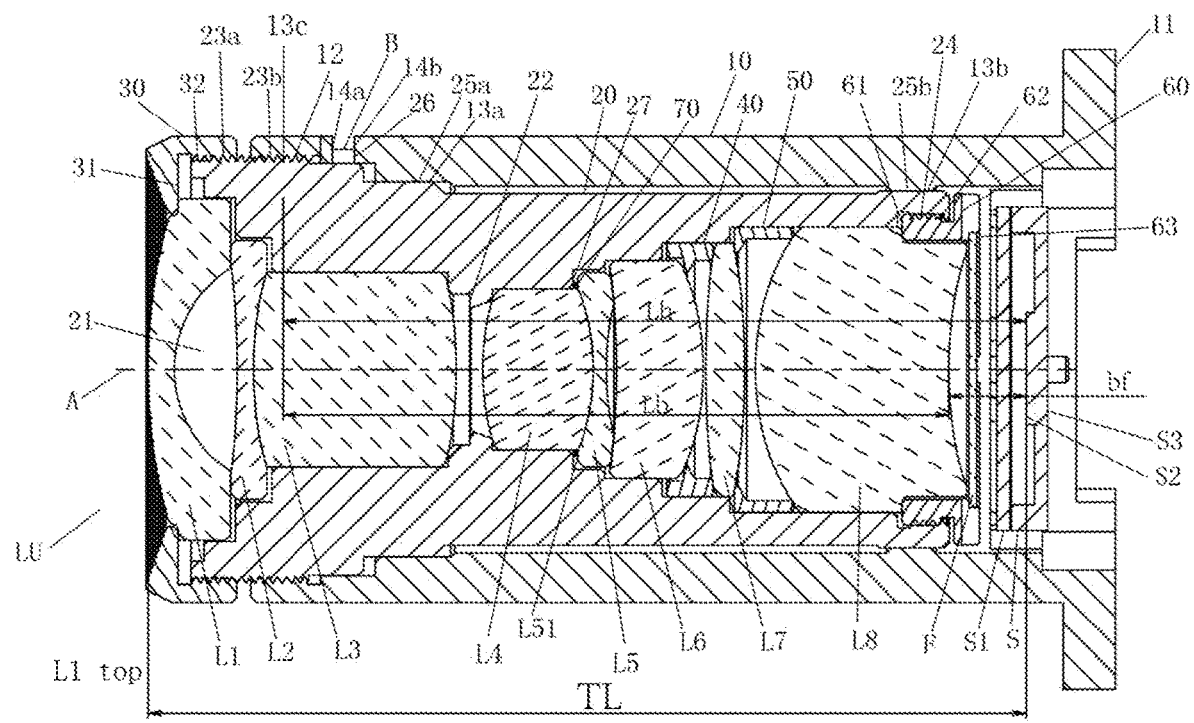
FIG. 1 is a sectional view showing the structure of the camera according to Embodiment 1 of the present disclosure.

FIG. 1 is an illustrative drawing showing the structure of the camera according to Embodiment 1 of the present disclosure. As shown in FIG. 1, the camera comprises a lens unit LU comprising a plurality of lenses, a holding member 10 which holds the lens unit LU, and a solid-state image pickup element S, such as CMOS or CCD, which receives a light beam transmitting the lenses.

The lens unit LU may include: lens L1 to lens L8, an optical filter F, a frame 20 having a lens receiving portion 21 for receiving and holding the lenses, a front side pressing ring 30 which presses and fixes lens L1 to lens L3 against the frame 20 and particularly having a lens holding portion 31 for positioning and holding the first lens L1, a rear side pressing ring 60 which presses and fixes lens L4 to lens L8 against the frame 20 and includes an engagement portion 63 for engaging and holding the optical filter F, and a biasing spring 70 having an elastic property and biasing lens L4 to lens L8 toward an image side. An aperture 22 is provided at the lens unit LU.

A thread portion 32 of the front side pressing ring 30 is threaded to a first front side thread portion 23a of the frame 20. A thread portion 62 of the rear side pressing ring 60 is threaded to a rear side thread portion 24 of the frame 20. The rear side pressing ring 60 is provided with a lens pressing portion 61 for pressing the lens L8.

Figure 3:
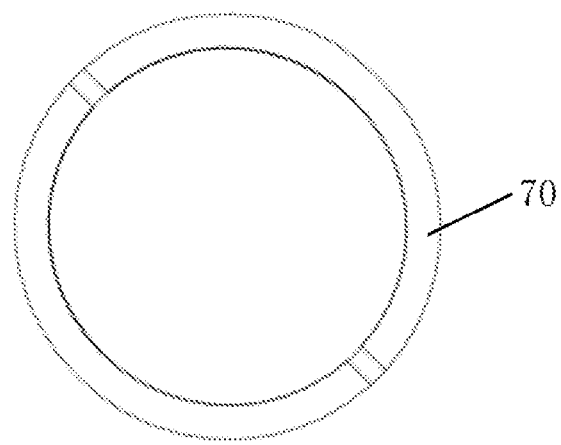
FIG. 3 is a front view of the elastic member according to Embodiment 1 of the present disclosure.
Figure 4:
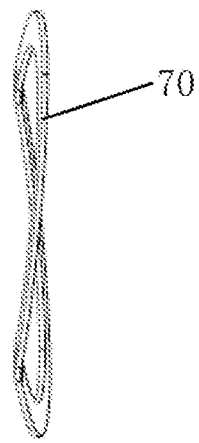
FIG. 4 is a side view of the elastic member according to Embodiment 1 of the present disclosure.

As shown in FIGS. 1, 3, and 4, the biasing spring 70 is a leaf spring shaped like a wave washer. The biasing spring 70 is compressed in a thickness direction between an abutting portion 27 of the frame 20 and an abutting portion L51 of the lens L5. The biasing spring 70 biases lens L4 to lens L8 towards the image side. It is to be appreciated that, in this embodiment, though the biasing spring 70 is compressed between the abutting portion 27 of the frame 20 and the abutting portion L51 of the lens L5 so that the biasing spring 70 biases the lens L5 directly, the biasing spring 70 biases lens L4 to lens L8 towards the image side because lens L4 and lens L5 are adhered together. Of course, the present disclosure is not limited this.

In addition, as shown in FIG. 1, a first spacing ring 40 is provided between the lens L6 and lens L7, and a second spacing ring 50 is provided between the lens L7 and lens L8.

Regarding the holding member 10, through the thread connection between the thread portion 12 of the holding member 10 and the second front side thread portion 23b of the frame 20, the lens unit LU is held such as to be movable in the direction of the optical axis. Moreover, the holding member 10 has a circuit substrate mounting portion 11 that is threaded or adhered to a circuit substrate (not shown) to which the solid-state image pickup element S is mounted.

The solid-state image pickup element S has a protective glass S1, an imaging plane S2, and circuit substrate connecting portion S3 which is electrically connected to the circuit substrate (not shown).

The holding member 10 further includes two engagement portions, namely a front side engagement portion 13a and a rear side engagement portion 13b, for engaging and holding the lens unit LU such that the lens unit LU is movable in the direction of the optical axis. The front side engagement portion 13a is engaged with the front side engagement portion 25a of the frame 20. The rear side engagement portion 13b is engaged with the rear side engagement portion 25b of the frame 20. Thus, the lens unit LU can be stably held in such manner that the optical axis A of the lens unit LU is perpendicular with respect to the imaging plane S2.

Furthermore, the thread portion 12 is provided on a side closer to the object than an intermediate portion between the front side engagement portion 13a and the rear side engagement portion 13b, and the second front side thread portion 23b is provided on a side closer to the object than an intermediate portion between the front side engagement portion 25a and the rear side engagement portion 25b. In addition, a distance between the front side engagement portion 13a and the rear side engagement portion 13b and a distance between the front side engagement portion 25a and the rear side engagement portion 25b are both equal to or greater than ½ of the total length of the lens unit. In other words, a central point 13c of the meshing portion between the thread portion 12 and the second front side thread portion 23b is provided on a side closer to the object than an intermediate portion of the optical total length TL of the camera. Therefore, even when, for example, a lateral pressure from the outside is applied to the lens unit, inclination of the optical axis such as offsetting of the focus position of the lens can be prevented. Herein, as shown in FIG. 1, the optical total length TL of the camera is a distance from a top end of the lens optical system, i.e., the top end of the lens, to the imaging plane S2.

Figure 2:
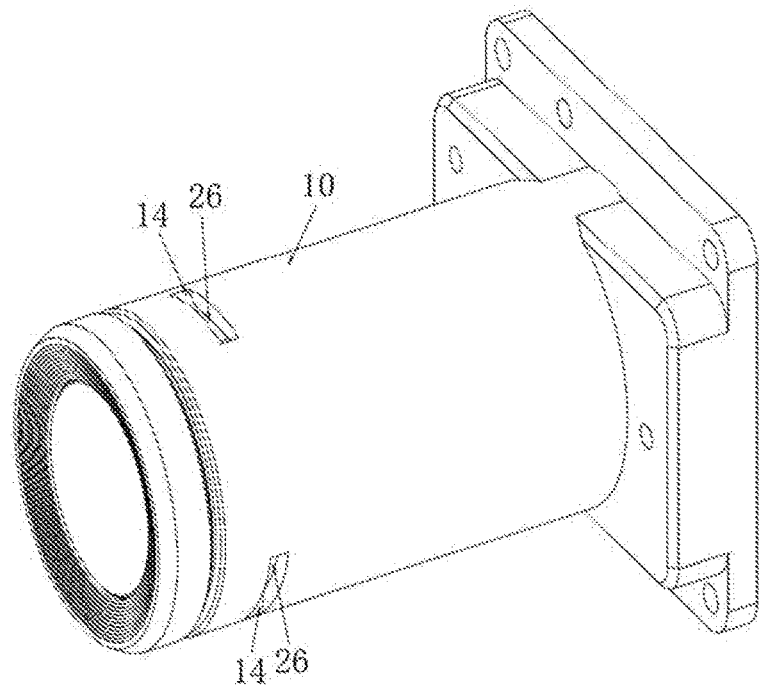
FIG. 2 is a perspective view showing the structure of the camera according to Embodiment 1 of the present disclosure.

As shown in FIGS. 1 and 2, the holding member 10 is provided with an adhesion portion 14 that penetrates a side face of the holding member 10 such that the frame 20 is exposed to the outer side. Through coating an adhesive B on the adhesion portion 14, it is possible to adhere the lens unit LU to the holding member 10 between a front end face 14a of the adhesion portion 14 and an adhesion portion 26 on a side face of the frame 20, and between a rear end face 14b of the adhesion portion 14 and the adhesion portion 26 on the side face of the frame 20. Furthermore, as shown in FIG.

2, three adhesion portions 14 are provided in the circumferential direction of the holding member 10 with intervals of 120°. In addition, the lens unit LU can be adhered directly by the adhesion portion 14, or the lens unit LU can be fixed via a further member that is adhered to the adhesion portion 14.

The advantages of the above adhesion method are described as below. In the past, the camera having a fixed focus has the problem of focus position offset caused by changes in temperature. The contributing factors include expansion and contraction of the adhesive which causes the lens unit to move.

For example, in JP2009186756A, the lens unit and the holding member are threaded together by threads. Thus, thread loosening may occur. Sometimes, changes of temperature may cause the adhesive to expand or contract, so that the lens unit moves an amount in the direction of the optical axis corresponding to the loosening of the threads, thereby causing offset of the focus position.

Through the adhesion method according to the present disclosure, even if the change of temperature causes the adhesive B to expand or contract, due to the restriction of the front end face 14a and the rear end face 14b of the adhesion portion 14 of the holding member 10, the lens unit LU will not move in the direction of the optical axis and can be stably maintain the focus position.

In addition, the adhesion is featured by low cost and simplicity. Nonetheless, threads, for example, can be provided on the side face as done by the prior art to fix the lens unit by threaded connection.

Further, U.S. Pat. No. 9,594,228 B1 disclosed a method, wherein the relationship of the lens mount (holding member), the lens barrel (frame), the collet, and the focal length of the lens is set to be as below:

$$Lc \cdot CTEc = Lm \cdot CTEm + Lb \cdot CTEb - Lf \cdot CTEf,$$

Wherein, Lc is the length of the collet, Lm is the length of the lens mount, Lb is the length of the lens barrel, Lf is the focal length of the lens, CTEc is the thermal expansion coefficient of the material of the collet, CTEm is the thermal expansion coefficient of the material of the lens mount, CTEb is the thermal expansion coefficient of the material of the lens barrel, and CTEf is the temperature change rate of the lens.

Thus, the focus position can be maintained when temperature changes. That is, U.S. Pat. No. 9,594,228 B1 provides a method for offsetting the displacement of the holding member and the frame that expand and contract in the same direction from the imaging face by means of expansion and contraction of the collet in an opposite direction when temperature changes.

On the other hand, according to the present disclosure, the holding member 10 and the frame 20 are fixed to each other by the thread portion 12 and the second front side thread portion 23b as well as the adhesion portions 14, 26 on the side closer to the object than the intermediate portion of the lens unit LU. Therefore, when temperature changes, the holding member 10 and the frame 20 expand or contact in opposite directions from the imaging plane S2. Therefore, according to the present disclosure, the relationship between the holding member 10, the frame 20, and the back focal length of the lens is set to be as below:

$$Lh \cdot CTEh = Lb \cdot CTEb - bf \cdot CTEf,$$

Wherein, Lh is the length of the holding member, Lb is the length of the frame, bf is the back focal length, CTEh is the thermal expansion coefficient of the material of the holding member, CTEb is the thermal expansion coefficient of the material of the frame, and CTEf is the temperature change rate of the lens, Wherein, CTEf is determined by the overall properties of the optical system including the optical total length TL.

Hence, the focus position can be maintained when temperature changes, thereby eliminating the need for the collet, so as to reduce the cost.

Figure 6:
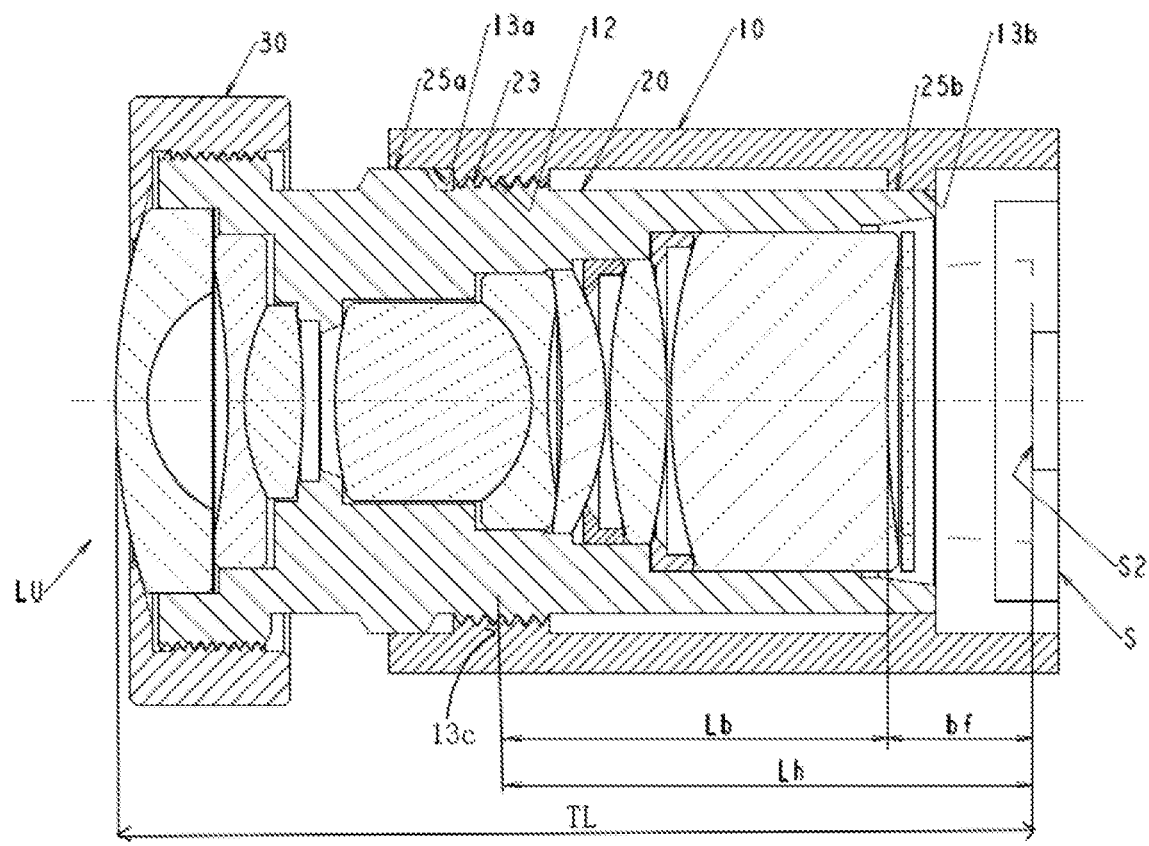
FIG. 6 is a sectional view showing the structure of the camera according to Embodiment 2 of the present disclosure.

Herein, as shown in FIGS. 1 and 6, the length Lh of the holding member is a distance from a central point 13c of the meshing portion between the thread portion 12 of the holding member 10 and the second front side thread portion 23b of the frame 20 to the imaging plane S2, and the length Lb of the frame is a distance from a central point 13c of the meshing portion between the thread portion 12 of the holding member 10 and the second front side thread portion 23b of the frame 20 to the back surface of the eighth lens L8. In addition, the back focal length bf is a distance from the back surface of the eighth lens L8 to the imaging plane S2.

Further, FIG. 6 is an illustrative drawing showing the structure of the camera according to Embodiment 2 of the present disclosure and shows a modified example of the camera according to Embodiment 1 of the present disclosure with a thread portion 12 provided between the front side engagement portion 13a and the rear side engagement portion 13b and a thread portion 23 provided between the front side engagement portion 25a and the rear side engagement portion 25b.

Figure 7:
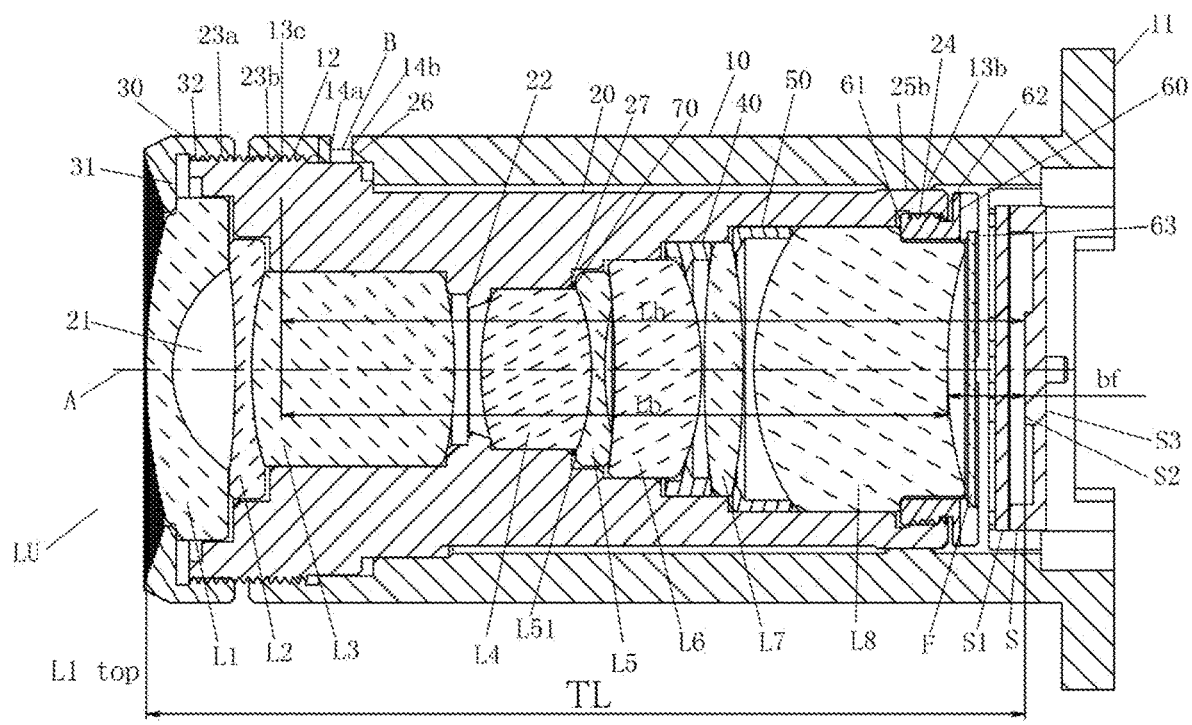
FIG. 7 is a sectional view showing the structure of the camera according to Embodiment 3 of the present disclosure.

Further, FIG. 7 is an illustrative drawing showing the structure of the camera according to Embodiment 3 of the present disclosure and shows a modified example of the camera according to Embodiment 1 of the present disclosure without the front side engagement portion 13a and the front side engagement portion 25a.

In Embodiment 2, same as Embodiment 1, the central point 13c of the meshing portion between the thread portion 12 and the second front side thread portion 23b is provided on a side closer to the object than the intermediate portion of the optical total length TL of the camera. Therefore, although the optical axis is not as accurate as in Embodiment 1, Embodiment 2 is, same as Embodiment 1, also capable of preventing inclination of the optical axis such as focus position offset of the lens even when, for example, a lateral pressure from the outside is applied to the lens unit.

In addition, the present disclosure comprises the biasing spring 70 that is elastic and biases lens L4 to lens L8 towards the image side. Thus, when temperature changes, even if a gap is generate due to the difference between the thermal expansion coefficient of the frame 20 and that of lens L4 to lens L8, loosening between lenses caused by the gap can be prevented. Meanwhile, the eighth lens L8 is ensured to be located at a position relatively close to the sensor, so that the back focal length bf can be stably maintained.

Furthermore, the elastic member may be provided between the sixth lens L6 and the seventh lens L7 or between the seventh lens L7 and the eighth lens L8, which can also prevent loosening between lenses caused by the gap generated due to the difference between the thermal expansion coefficients, and thus the back focal length bf can be stably maintained.

Figure 5:
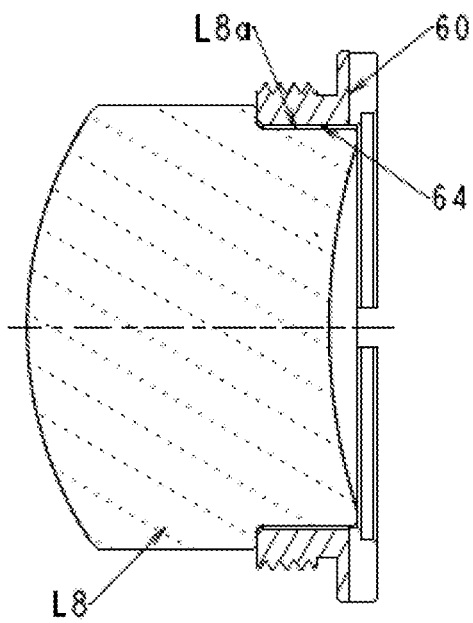
FIG. 5 is an illustrative drawing of the adhesion configuration according to Embodiment 1 of the present disclosure.

Moreover, as shown in FIG. 5, the rear side pressing ring 60 and the eighth lens L8 are adhered and fixed by the lens adhesion portion L8a, 64. Although lens loosening due to thermal expansion cannot be thereby prevented, the eighth lens L8 is always maintained at a position close to the sensor, so that the back focal length bf can also be stably maintained. The adhesion fixation can also be performed between the frame 20 and the eighth lens L8.

Figure 8:
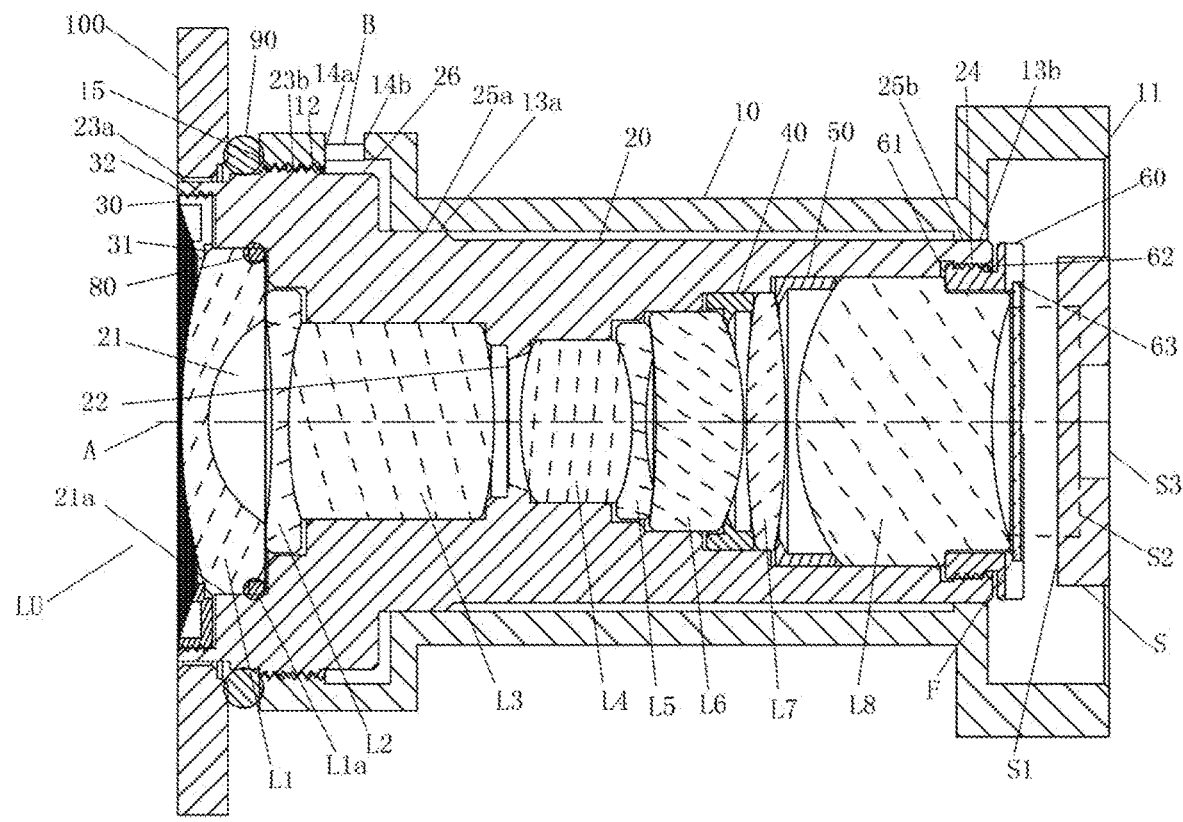
FIG. 8 is a sectional view showing the structure of the camera according to Embodiment 4 of the present disclosure.

Next, a further advantage of this adhesion method will be explained with reference to FIG. 8. FIG. 8 is an illustrative drawing showing the structure of the camera according to Embodiment 4 of the present disclosure, which is a modified example of the camera according to Embodiment 1 of the present disclosure and an example of a camera having a waterproof configuration. Description of the part same with the camera according to Embodiment 1 of the present disclosure is omitted.

The lens unit LU comprises a seal member 80 having an elastic property and compressed in a radial direction (in a direction perpendicular to the optical axis) between a lateral necking portion L1a of the first lens L1 and a L1 engagement portion 21a of the frame 20, so as to ensure the waterproof property in the lens receiving portion 21 of the frame 20.

The camera further comprises a seal member 90 having an elastic property and compressed only in the direction of the optical axis between a front end portion 15 of the holding member 10 and a housing 100, so as to ensure the waterproof property of a peripheral portion of the camera.

In the present disclosure, the lens unit adhesion fixation portion, which is located at the front end portion of the holding member in the prior art, is located in a through hole extending from the side face of the holding member 10 towards the lens unit LU, i.e., the adhesion portion 14. Therefore, the seal member 90 will not interfere with the adhesive B, thereby the waterproof property can be ensured.

Furthermore, according to this waterproof configuration, even when the lens unit LU and the housing 100 offset due to error of the parts, a lateral pressure will not be applied to the lens unit LU under the elastic force of the seal member 90. Therefore, the focus position of the lens can be stably maintained.

Figure 9:
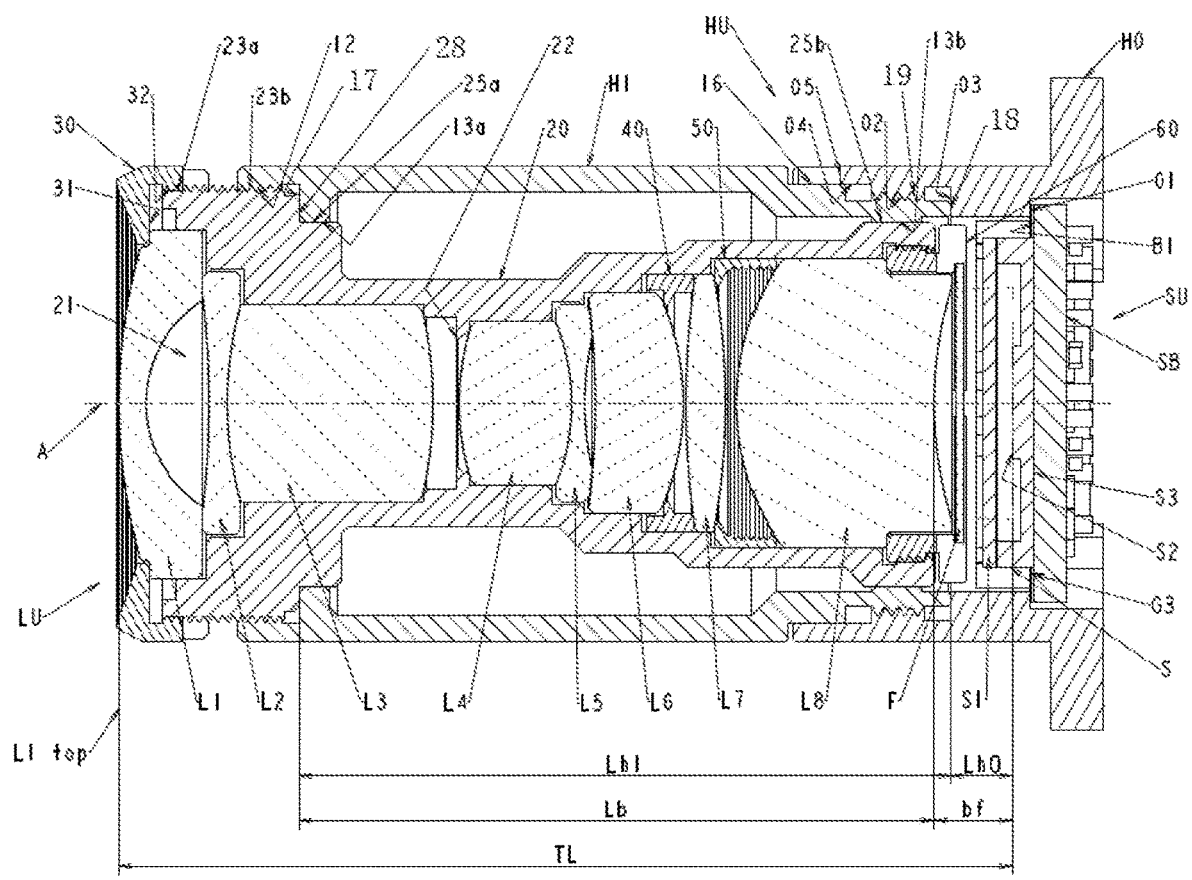
FIG. 9 is a sectional view showing the structure of the camera according to Embodiment 5 of the present disclosure.

Next, a further structure of the holding member of the camera will be described with reference to FIGS. 9 to 11. FIGS. 9 and 11 are illustrative drawings showing the structure of the camera according to Embodiment 5 of the present disclosure, which is a modified example of the camera according to Embodiment 1 of the present disclosure and an example of the camera in which the holding member consists of two parts that are independent from each other. Description of the part same with the camera according to Embodiment 1 of the present disclosure is omitted.

Figure 10:
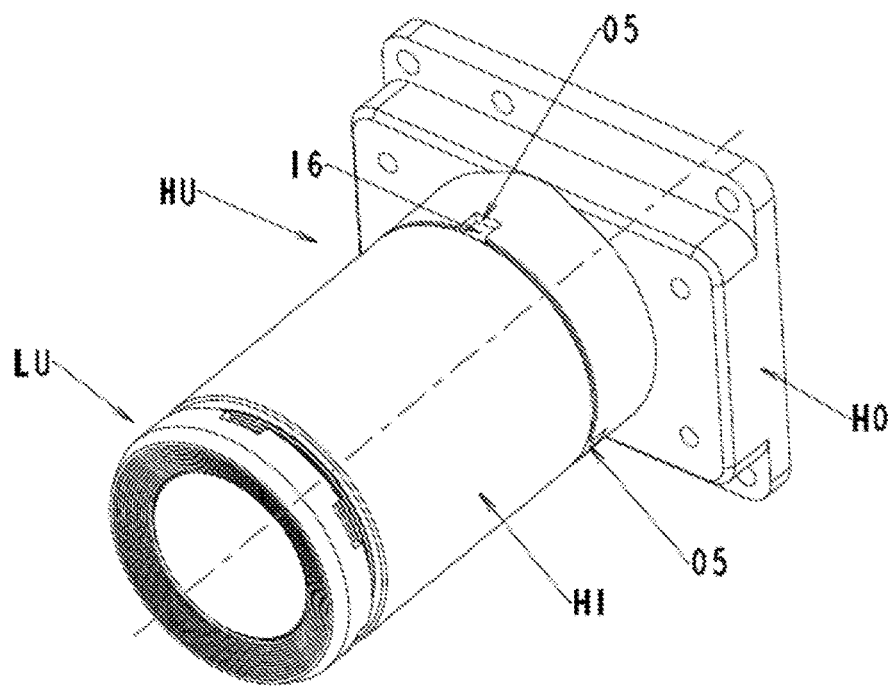
FIG. 10 is a perspective view showing the structure of the camera according to Embodiment 5 of the present disclosure.
Figure 11:
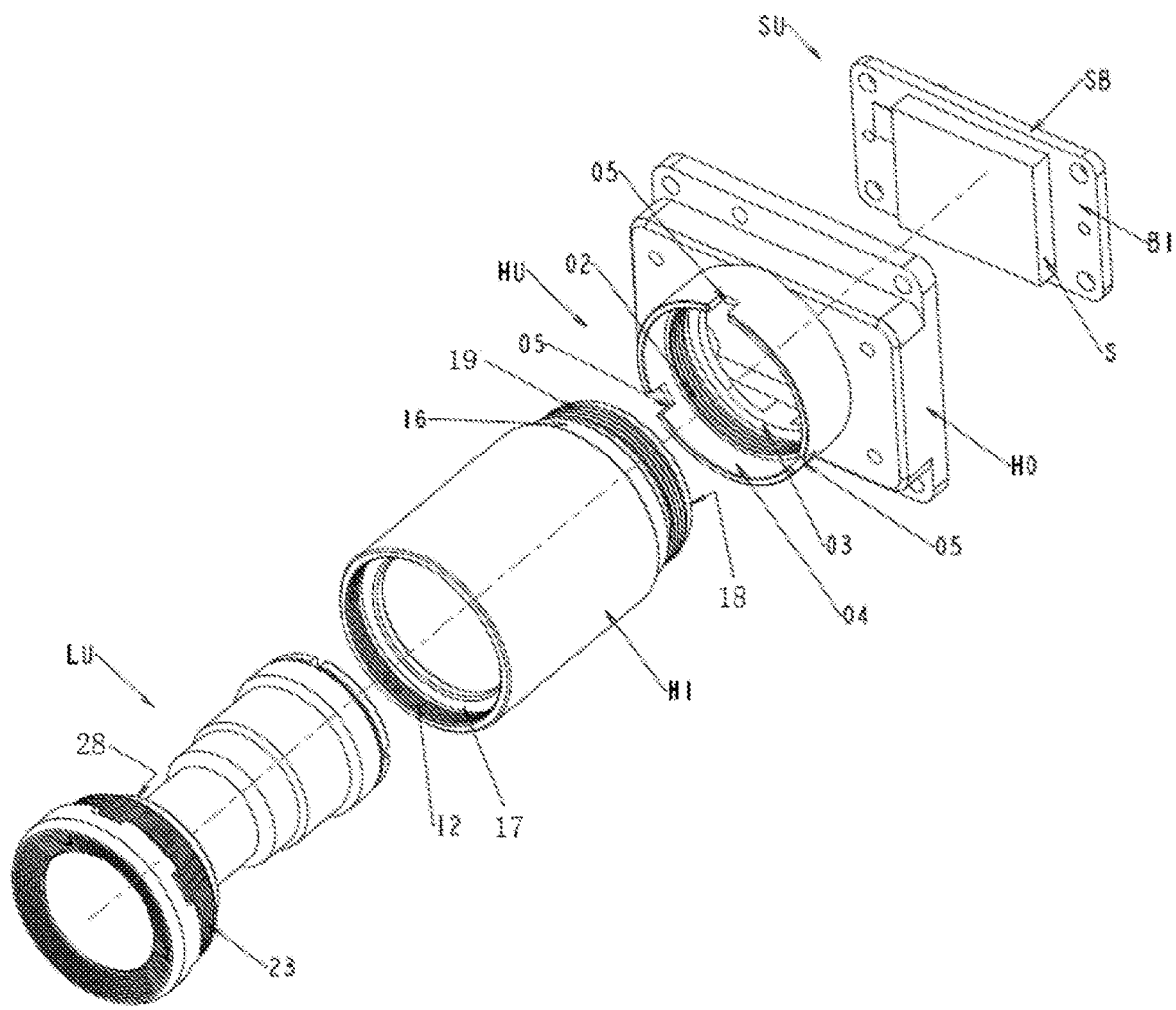
FIG. 11 is a perspective exploded view showing the structure of the camera according to Embodiment 5 of the present disclosure.

As shown in FIGS. 9 to 11, the camera comprises a lens unit LU including a plurality of lenses, a holding member unit HU which holds the lens unit LU, and an image pickup element unit SU having a solid-state image pickup element S such as CMOS or CCD mounted thereto, the solid-state image pickup element S receiving a light beam transmitting the lenses.

The present embodiment omits the biasing spring 70 in Embodiment 1.

The holding member unit HU comprises a holding member seat H0 configured as an image pickup element unit holding portion and holding the image pickup element unit SU, and a holding member cylinder portion H1 configured as a lens unit holding portion and holding the lens unit LU. Through the engagement between an engagement portion 04 of the holding member seat H0 and a holding member engagement portion 16 of the holding member cylinder portion H1, and the abutment between an abutment portion 03 of the holding member seat H0 and a holding member abutment portion 18 of the holding member cylinder portion H1, the holding member seat H0 and the holding member cylinder portion H1 are positioned relative to each other. In addition, through the threaded connection between a thread portion 02 of the holding member seat H0 and a holding member thread portion 19 of the holding member cylinder portion H1, and the adhesion between a adhesion portion 05 of the holding member seat H0 and the holding member engagement portion 16 of the holding member cylinder portion H1, the holding member seat H0 and the holding member cylinder portion H1 are fixed together.

The holding member seat H0 faces the image pickup element unit SU in such a manner that there is a space G3 interposed between a substrate mounting portion 01 of the holding member seat H0 and a mounting face B1 of an image pickup element substrate SB. The focus is adjusted by a commonly known method, so that an image formed by the lens unit LU forms, without tilting, on the imaging plane S2 of the solid-state image pickup element S (the optical axis A of the lens unit LU is perpendicular with respect to the imaging plane S2). Then, the holding member seat H0 and the image pickup element unit SU are fixed by a fixing method such as adhesion or threaded fixation.

In addition, the holding member cylinder portion H1 is, via the thread portion 12 thereof, threaded to the second front side thread portion 23b of the frame 20, and the abutment portion 17 of the holding member cylinder portion H1 abuts against the abutment portion 28 of the frame 20, so as to fix and hold the lens unit LU.

The holding member cylinder portion H1 further comprises a front side engagement portion 13a and a rear side engagement portion 13b, which are configured for engaging with the lens unit LU so as to hold the lens unit LU. The front side engagement portion 13a engages with the front side engagement portion 25a of the frame 20, and the rear side engagement portion 13b engages with the rear side engagement portion 25b of the frame 20.

The solid-state image pickup element S has a protective glass S1 and a circuit substrate connecting portion S3 which is electrically connected to a circuit substrate.

In the camera disclosed in Embodiment 2 and U.S. Pat. No. 9,594,228 B1, the materials of the holding member and the frame need to differ from each other in terms of thermal expansion coefficient, or the materials of the holding member, the frame, and the collet need to differ from each other in terms of thermal expansion coefficient. For example, when a material having a thermal expansion coefficient that is clearly smaller than a commonly used general material is selected as the material of the holding member, the processability worsens and the cost of material increases, which results the concern of cost increase.

According to Embodiment 5, the holding member seat H0 and the holding member cylinder portion H1 are separated from each other. Further, for example, the holding member seat H0 having a complicated shape uses a general and cheap material that is commonly used, and the holding member cylinder portion H1 having a simple shape uses a material of a thermal expansion coefficient that is clearly low. In other words, in at least some examples, the thermal expansion coefficient of the material forming the holding member cylinder portion H1 is smaller than that of the material forming the holding member seat H0. Thus, it is possible to suppress the processing cost and provide at a low cost a camera capable of stably maintaining a focus position when the temperature changes, just like Embodiment 2 and U.S. Pat. No. 9,594,228 B1.

It is to be appreciated that in Embodiment 5, the material forming the holding member cylinder portion H1 and the material forming the holding member seat H0 may each have a thermal expansion coefficient that is smaller than that of the material forming the frame 20. In at least some examples, at least the material forming the holding member cylinder portion H1 has a smaller thermal expansion coefficient than that of the material forming the frame 20. In at least some examples, an axial length of the holding member cylinder portion H1 is greater than the axial length of the holding member seat H0.

In addition, the relationship between the holding member, the frame and the back focal length of the lens is as below:

$$Lh0 \cdot CTEh0 + Lh1 \cdot CTEh1 = Lb \cdot CTEb \cdot bf \cdot CTEf,$$

Wherein, Lh0 is the length of the holding member seat, Lh1 is the length of the holding member cylinder portion, Lb is the length of the frame, bf is the back focal length, CTEh0 is the thermal expansion coefficient of the material of the holding member seat, CTEh1 is the thermal expansion coefficient of the material of the holding member cylinder portion, CTEb is the thermal expansion coefficient of the material of the frame, and CTEf is the temperature change rate of the lens.

Herein, as shown in FIG. 9, the length Lh0 of the holding member seat is a distance from an abutting portion between the abutment portion 03 of the holding member seat H0 and the holding member abutment portion 18 of the holding member cylinder portion H1 to the imaging plane S2.

The length Lh1 of the holding member cylinder portion is a distance from the abutting portion between the abutment portion 17 of the holding member cylinder portion H1 and the abutment portion 28 of the frame 20 to the abutting portion between the abutment portion 18 of the holding member cylinder portion H1 and the abutment portion 03 of the holding member seat H0. The length Lb of the frame is a distance from the abutting portion between the abutment portion 17 of the holding member cylinder portion H1 and the abutment portion 28 of the frame 20 to the back surface of the eighth lens L8. In addition, the back focal length bf is a distance from the back surface of the eighth lens L8 to the imaging plane S2.

Moreover, by choosing materials for the holding member cylinder portion H1 and the frame 20 appropriately, lenses having various optical total length TL and temperature change rate CTEf would also be capable of maintaining a stable focal position.

Figure 12:
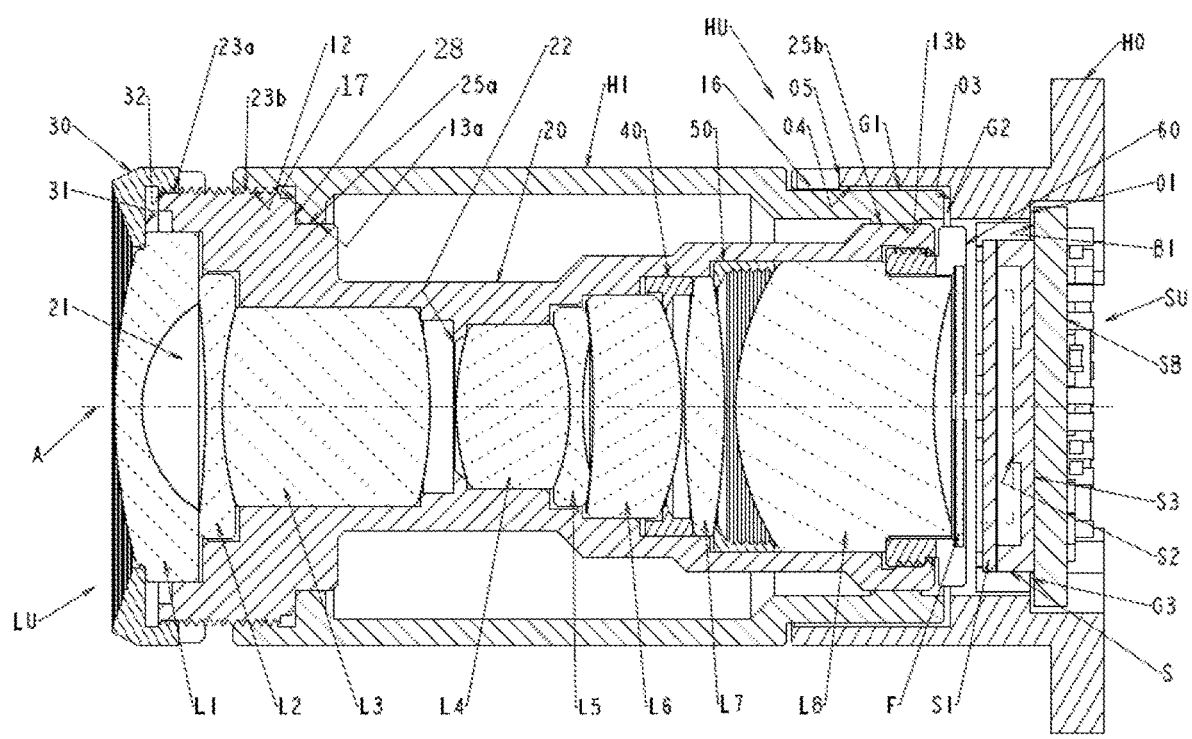
FIG. 12 is a sectional view showing the structure of the camera according to a modified example of Embodiment 5 of the present disclosure.

In addition, the thread portion 02 of the holding member base H0 and the holding member thread portion 19 of the holding member cylinder portion H1 can be omitted. As shown in the modified example of FIG. 12, a space G1 and a space G2 are provided between the holding member base H0 and the holding member cylinder portion H1. Thus, focusing can be performed by a commonly known focus adjusting method. Then, adhesion is performed, so that an image formed by the lens unit LU fixedly held by the holding member cylinder portion H1 is formed, without tilting, on the imaging plane S2 of the solid-state image pickup element S fixedly held by the holding member seat H0.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A camera, comprising:
a lens unit having a plurality of lenses and a frame receiving the plurality of lenses;
a holding member holding the lens unit; and
an image pickup element for receiving a light beam transmitting the plurality of lenses,
wherein, the holding member comprises:
a thread portion by means of which the lens unit is movable along an optical axis, and one two engagement portions engaging the lens unit, the thread portion having a meshing portion with a central point thereof provided on a side closer to an object than an intermediate portion of an optical total length of the camera,
wherein the two engagement portions are arranged to be spaced by an interval of more than a half of a total length of the lens unit.

2. The camera according to claim 1, wherein the thread portion is provided at a top end portion of the holding member on a side that is closest to the object.

3. The camera according to claim 1, wherein a material of the holding member has a thermal expansion coefficient that is smaller than a thermal expansion coefficient of a material of the frame.

4. The camera according to claim 3, wherein the holding member, the frame, and a back focal length of the lens unit satisfy a relationship of $$Lh \cdot CTEh = Lb \cdot CTEb - bf \cdot CTEf,$$

wherein, Lh is a length of the holding member, Lb is a length of the frame, bf is the back focal length, CTEh is the thermal expansion coefficient of the material of the holding member, CTEb is the thermal expansion coefficient of the material of the frame, and CTEf is a temperature change rate of the lens unit.

5. The camera according to claim 1, wherein the lens unit has a fixing member which fixes a lens closest to an imaging plane with regard to the frame towards a direction of the image pickup element.

6. The camera according to claim 5, wherein the fixing member adheres the lens closest to the imaging plane to the frame, or adheres the lens closest to the imaging plane to a pressing ring.

7. The camera according to claim 5, wherein the fixing member is a resilient member biasing the lens closest to the imaging plane towards a direction of the imaging plane.

8. The camera according to claim 1, wherein the camera further comprises an image pickup element unit to which the image pickup element is mounted, the holding member comprises:
a lens unit holding portion holding the lens unit; and
an image pickup element unit holding portion holding the image pickup element unit, wherein, a material forming the lens unit holding portion is different from the material forming the image pickup element unit holding portion.

9. The camera according to claim 8, wherein the material forming the lens unit holding portion has a thermal expansion coefficient that is different from a thermal expansion coefficient of the material forming the image pickup element unit holding portion.

10. The camera according to claim 9, wherein the thermal expansion coefficient of the material forming the lens unit holding portion is smaller than the thermal expansion coefficient of the material forming the image pickup element unit holding portion.

11. The camera according to claim 8, wherein the material forming the frame has a thermal expansion coefficient that is different from a thermal expansion coefficient of the material forming the lens unit holding portion.

12. The camera according to claim 8, wherein the lens unit holding portion and the image pickup element unit holding portion are fixed to each other via a thread.

13. The camera according to claim 8, wherein a space is provided between the lens unit holding portion and the image pickup element unit holding portion, by which a relative position relation between the lens unit and the image pickup element is adjustable, the lens unit holding portion and the image pickup element unit holding portion are adhered to each other at an adjusted position.

14. A camera, comprising:
a lens unit having a plurality of lenses and a frame receiving the plurality of lenses;
a holding member holding the lens unit; and
an image pickup element for receiving a light beam transmitting the plurality of lenses,
wherein, the holding member comprises:
a thread portion by means of which the lens unit is movable along an optical axis, and
at least one engagement portion engaging the lens unit,
the thread portion having a meshing portion with a central point thereof provided on a side closer to an object than an intermediate portion of an optical total length of the camera,
wherein the holding member comprises an adhesion portion by means of which the lens unit is fixed,
a hole is provided in the holding member to penetrate the holding member from a side face of the holding member towards the lens unit,
the adhesion portion is configured for adhesion fixation between the hole and a side face or side surfaces of the lens unit.

15. A camera, comprising:
a lens unit having a plurality of lenses and a frame receiving the plurality of lenses;
a holding member holding the lens unit; and
an image pickup element unit to which an image pickup element is mounted, the image pickup element receiving a light beam transmitting the plurality of lenses,
wherein, the holding member comprises:
a lens unit holding portion holding the lens unit; and
an image pickup element unit holding portion holding the image pickup element unit, wherein a material forming the lens unit holding portion is different from a material forming the image pickup element unit holding portion,
wherein the material forming the lens unit holding portion and the material forming the image pickup element unit holding portion both have a smaller thermal expansion coefficient than that of a material forming the frame.

16. The camera according to claim 15, wherein the thermal expansion coefficient of the material forming the lens unit holding portion is smaller than the thermal expansion coefficient of the material forming the image pickup element unit holding portion.

17. The camera according to claim 15, wherein the lens unit holding portion has an axial length that is greater than the axial length of the image pickup element unit holding portion.

18. The camera according to claim 15, wherein the image pickup element unit holding portion and the lens unit holding portion are fixed to each other by a threaded connection between a thread portion of the image pickup element unit holding portion and a holding member thread portion of the lens unit holding portion and an adhesion between an adhesion portion of the image pickup element unit holding portion and a holding member engagement portion of the lens unit holding portion.

* * * * *

UNITED STATES PATENT AND TRADEMARK OFFICE
CERTIFICATE OF CORRECTION

Page 1 of 1

PATENT NO. : 11,140,303 B2
APPLICATION NO. : 16/504827
DATED : October 5, 2021
INVENTOR(S) : Huo It is certified that error appears in the above-identified patent and that said Letters Patent is hereby corrected as shown below:

On the Title Page

(30) Foreign Application Priority Data
May 7, 2018 (WO)..........................................................PCT/CN/085868
Jul. 20, 2018 (CN).........................................................201821156960.7

Should read:

Related U.S. Application Data
(63) Continuation of application No. PCT/CN2018/085868, filed on May 7, 2018.

(30) Foreign Application Priority Data
Jul. 20, 2018 (CN).........................................................201821156960.7

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*